(12) United States Patent
Yuan et al.

(10) Patent No.: US 12,141,598 B2
(45) Date of Patent: Nov. 12, 2024

(54) MANAGING HYPER-CONVERGED INFRASTRUCTURE (HCI) APPLIANCE NODES AND CLUSTERS WITH DHCP-BASED RESOURCE

(71) Applicant: Dell Products L.P., Round Rock, TX (US)

(72) Inventors: Hong Yuan, Shanghai (CN); HongGang Liu, Shanghai (CN); Yining Chu, Shanghai (CN); Zhe Huang, Suzhou (CN)

(73) Assignee: Dell Products L.P., Round Rock, TX (US)

( * ) Notice: Subject to any disclaimer, the term of this patent is extended or adjusted under 35 U.S.C. 154(b) by 455 days.

(21) Appl. No.: 17/691,895

(22) Filed: Mar. 10, 2022

(65) Prior Publication Data

US 2023/0266990 A1    Aug. 24, 2023

(30) Foreign Application Priority Data

Feb. 23, 2022    (CN) .......................... 202210169252.1

(51) Int. Cl.
    *G06F 9/455*        (2018.01)
    *G06F 8/61*         (2018.01)
    (Continued)

(52) U.S. Cl.
    CPC ............ *G06F 9/45558* (2013.01); *G06F 8/63* (2013.01); *G06F 9/4401* (2013.01); *G06F 9/5077* (2013.01); *H04L 61/5014* (2022.05); *H04L 61/5076* (2022.05); *G06F 2009/4557* (2013.01); *G06F 2009/45595* (2013.01); *G06F 2209/505* (2013.01)

(58) Field of Classification Search
    CPC ............... G06F 9/45558; G06F 9/5077; G06F 2009/4557; G06F 2009/45595; G06F 2209/505; G06F 9/5072; G06F 3/0635; H04L 61/5014; H04L 41/0806; H04L 41/344; H04L 49/254; H04L 67/025
    See application file for complete search history.

(56) References Cited

U.S. PATENT DOCUMENTS 11,201,785 B1* 12/2021 Kanevsky ........... H04L 41/0843
2016/0028695 A1* 1/2016 Binder ................. G06F 21/602
                                                                          726/12

(Continued)

*Primary Examiner* — Brian W Wathen
(74) *Attorney, Agent, or Firm* — Jackson Walker L.L.P.

(57) ABSTRACT

A disclosed method may assign, with a DHCP module, two static IP addresses to each of one or more hyper-converged infrastructures nodes. The two static IP addresses may include an out of band IP address for a baseboard management controller (BMC) network interface to an OOB management network and an internal management IP address for a network interface associated with an internal management network. Disclosed methods may then access, for each of the one or more nodes, a BMC at the OOB IP address, to invoke a BMC tool to retrieve cluster configuration information for each node. A dashboard user interface may then be generated, based on the configuration retrieved for each node, and displayed. The cluster configuration information may indicate whether the node is a cluster node, comprising a node assigned to a cluster, or a free node, comprising a node not assigned to a cluster.

20 Claims, 3 Drawing Sheets

(51) Int. Cl.
*G06F 9/4401* (2018.01)
*G06F 9/50* (2006.01)
*H04L 61/5014* (2022.01)
*H04L 61/5076* (2022.01)

(56) References Cited

U.S. PATENT DOCUMENTS

2016/0224277 A1* 8/2016 Batra ..................... H04L 41/12
2019/0377496 A1* 12/2019 Olarig ................... H04L 49/357
2022/0156218 A1* 5/2022 Whitney ............. G06F 13/4068

* cited by examiner

MANAGING HYPER-CONVERGED INFRASTRUCTURE (HCI) APPLIANCE NODES AND CLUSTERS WITH DHCP-BASED RESOURCE

TECHNICAL FIELD

The present disclosure relates to information handling systems and, more particularly, information handling system appliances featuring a hyper-converged infrastructure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be implemented with a hyper-converged infrastructure (HCI) featuring virtualized compute, storage, and network resources and centralized management. Commercially distributed examples of HCI design include the VxRail family of HCI appliances from Dell Technologies. HCI appliances may support a wide variety of node and cluster configurations. In some cases, the level of virtualization and the complexity of the configuration may obscure underlying structural aspects of an HCI Solution.

SUMMARY

Methods and systems disclosed herein may assign, with a dynamic host configuration protocol (DHCP) module, two static IP addresses to each of one or more hyper-converged infrastructures nodes within a group of nodes associated with an information handling system. The two static IP addresses may include an out of band (OOB) IP address for a baseboard management controller (BMC) network interface to an OOB management network and an internal management IP address for a network interface associated with an internal management network. Disclosed methods may then access, for each of the one or more nodes, a BMC at the OOB IP address, to invoke a BMC tool to retrieve cluster configuration information for each node. A user interface, referred to herein as a dashboard user interface, may then be generated, based on the configuration retrieved for each node, and displayed. The cluster configuration information may include information indicative of whether the node is a cluster node, comprising a node assigned to a cluster, or a free node, comprising a node not assigned to a cluster. The cluster configuration information may further include, for each free node, information indicating whether the free node is a fresh node, comprising a node not previously configured, or a dirty node, comprising a previously configured node. The cluster configuration may further indicate, for each cluster node, a cluster management instance associated with the cluster node.

The cluster configuration information may, in some embodiments, include a cloud foundation window indicative of nodes within a VMware cloud foundation (VCF). The VCF may include a management domain and one or more workload domains. The cloud foundation window may indicate nodes within the management domain and nodes within each of the one or more workload domains.

A cluster management engine application programming interface (API) may be called to determine cluster member information indicating other cluster nodes associated with the cluster management engine instance, wherein the cluster configuration information includes the cluster member information. The cluster configuration display may include a free node window listing the free nodes and a cluster window identifying one or more clusters. Each cluster may be identified with a listing of nodes belonging to the cluster. The configuration information may include version information indicative of a version of the HCI appliance. The utility may enable administrators and other users to initiate a reimaging request to reimage any dirty nodes. Hardware information indicative of hardware implemented in a node may be obtained from an agent executing on a hypervisor associated with the node. The cluster configuration user interface may group or otherwise arrange the display of one or more free node groups, wherein nodes in a free node group are implemented with like hardware.

Responsive to user input selecting two or more fresh nodes, a new cluster may be created encompassing each of the two or more fresh nodes. Responsive to user input indicative of a particular node, the particular node may be configured as a primary node for the cluster. A cluster manager engine of the particular node may be activated while cluster management engines of other nodes in the cluster may be deactivated.

The configuration utility may support user input dragging and dropping a fresh node into a cluster listing, adding the fresh node to the cluster listing to the fresh node. Conversely, the utility may support dragging a cluster node to the free pool to release the node from the cluster.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
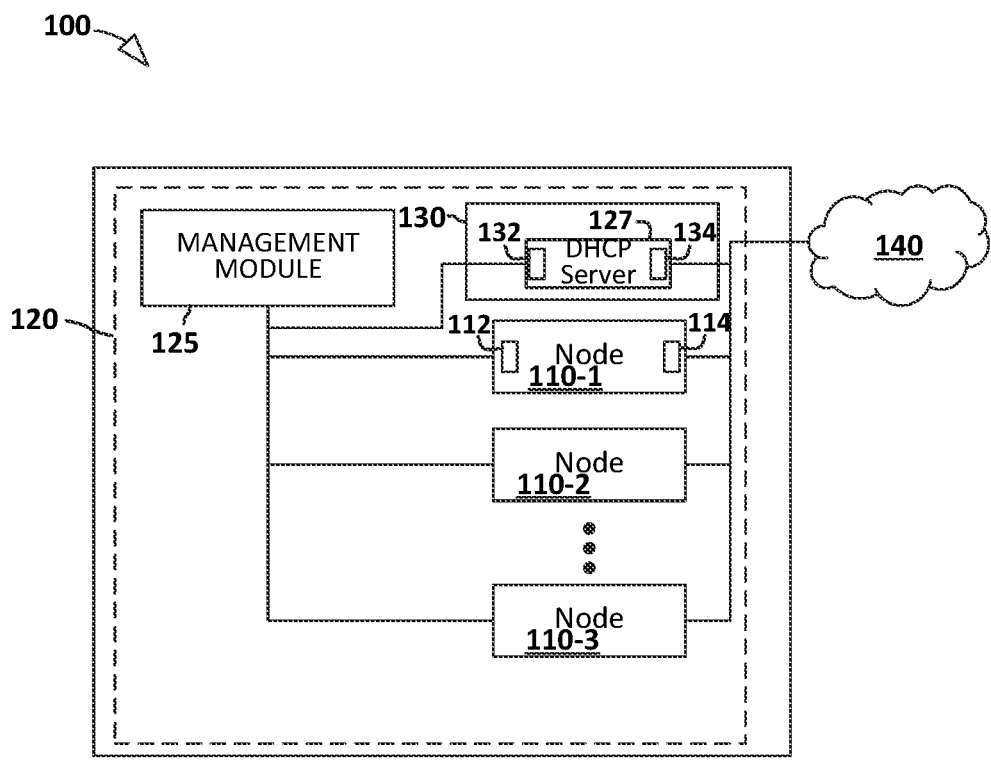
FIG. 1 illustrates a block diagram of an information handling system including a node configuration utility disclosed herein.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

FIG. 1 illustrates an information handling system 100 in accordance with disclosed teachings. The information handling system 100 illustrated in FIG. 1 includes information handling resources referred to herein as hyper-converged infrastructure (HCI) nodes or, more simply, nodes 110, of which FIG. 1 illustrates three instances 110-1, 110-2, and 110-3. Other embodiments may include more or fewer nodes 110.

Each node 110 may be implemented with rack-mount server-class hardware and a set of tightly integrated software components supporting virtualized compute, storage, and network resources with advanced management capabilities. The virtualization software may abstract and pool the node's resources and dynamically allocate them to applications running in virtual machines or containers. Each node 110 may be provided as an HCI appliance. Commercially distributed examples of HCI appliances suitable for use within the information handling system 100 depicted in FIG. 1 include any of the VxRail family of HCI appliances from Dell Technologies. In at least one embodiment, each node 110 corresponds to a single-node, 1U or 2U rack-mount HCI appliance. In some embodiments, the nodes 110 are contained within a single rack-mount cabinet. In other embodiments, nodes 110 may occupy slots in two or more cabinets.

The nodes 110 are illustrated within a management domain 120 associated with a management module 125 that provides a centralized platform for managing virtual infrastructure within management domain 120. In some embodiments, configuration of management module 125 may be implemented with vCenter Server software from VMware augmented with a VxRail Manager plugin from Dell Technologies.

The information handling system of FIG. 1 further includes a configuration utility 130 in accordance with disclosed teachings. Configuration utility 130 may leverage an out of band management resource within each node to retrieve configuration information from each node 110 and to generate a user interface, referred to herein as an HCI dashboard, indicating node and cluster configuration information for all nodes 110 within management domain 120. Configuration utility 130 may support additional configuration functionality as described in more detail below.

Configuration utility 130 may be implemented as an HTTP server that includes an embedded dynamic host configuration protocol (DHCP) server 127. Two network interfaces are assigned to the configuration utility 130 depicted in FIG. 1. An internal management interface 132 connects configuration utility 130 with management module 125 while an out of band network interface 134 connects to a remote, out of band management network 140. In at least some embodiments, configuration utility 130 has access to information indicating account information for connecting to out of band management resources and virtualized hosts.

When configuration utility 130 is launched, it assigns an internal management IP address to an internal management network interface 112 on each node 110 and an OOB IP address to an OOB network interface 114, which may correspond to a baseboard management controller, remote access controller such as an iDRAC from Dell Technologies, or the like on each node 110. If the managed domain 120 includes existing nodes that already have assigned IP addresses, an administrator can manually provide the IP address information to configuration utility 130.

Configuration utility 130 may access the list of IPs assigned by the DHCP server 127. From this list, configuration utility 130 can determine which IP addresses are associated with the OOB resources on each node. Once the OOB IP addresses are known, configuration utility 130 may employ an existing OOB management service or tool to node configuration information. For embodiments in which the OOB management resource is an integrated Dell remote access controller (iDRAC), as a non-limiting example, configuration utility 130 may leverage ipmitool or racadm command systems.

The node configuration information that configuration utility 130 obtains may include information indicating which nodes have been allocated to a multi-node cluster and which nodes are "free" i.e., not allocated to a cluster.

For nodes that have already been added to a cluster, the node configuration information may include information identifying the nodes in the cluster and the corresponding HCI management software.

For the free nodes, i.e., nodes that have not been assigned to any cluster, the node configuration information includes "clean/dirty" information indicating whether the node was previously configured and therefore in need of re-imaging, or not previously configured and therefore available for use.

In some embodiments, the node configuration dashboard may group clean and dirty nodes together within a free node section of the dashboard. In some embodiments, the free nodes, both clean and dirty, may be grouped in accordance with a version of the HCI management software managing the node.

Node configuration utility 130 may further include functionality to initiate re-imaging of dirty nodes and, in some embodiments, this functionality may be invoked directly from the dashboard main page (illustrated in FIG. 2 discussed below).

At least some embodiments of node configuration utility 130 may support more advanced configuration functions. As a non-limiting example, embodiments of node configuration utility 130 can communicate with agents running on those nodes to identify the hardware resources associated with each node. Based on the hardware information received, node configuration utility 130 may define like-hardware groups of nodes wherein each of the nodes in a group share identical or substantially similar hardware.

Node configuration utility 130 may also enable administrators to identify clusters by defining names for each cluster. In at least some embodiments, node configuration utility 130 may also support a cluster creation feature enabling administrators to select ready-status nodes, i.e., clean nodes not assigned to a cluster, for creating a new cluster and launching a bring-up process to initialize the new cluster. This functionality may be further extended, in at least some embodiments, by invoking an HCI management API to perform multiple cluster bring-ups. In embodiments that employ VxRail appliances for nodes 110, as an example, the VxRail Initialize API may enable this functionality.

In some embodiments, whenever multiple nodes are added to different clusters, administrators can use node configuration utility 130 to specify one node as the primary node. In some embodiments, the designation of a primary node designates the HCI manager resident on the primary node as the active HCI manager while HCI management resources executing on the non-primary nodes of the same cluster may be powered off automatically.

The node configuration utility 130 may also enable administrators to do a first run by specifying the needed JSON file for bring-up. This will prevent auto node discovery of VxRail manager. In at least some embodiments, the node configuration utility supports bringing up multiple clusters at the same time.

Using the node configuration utility 130, administrators may also be able to drag and drop a ready node from the free pool to any existing cluster for node expansion. Conversely, administrators can also drag a node from a cluster and drop the node into the free pool for node removal.

In at least some embodiments that support VCF on HCI appliances, including embodiments that support VCF on VxRail, node configuration utility 130 enables administrators to specify which nodes to include in the VCF deployment.

Figure 2:
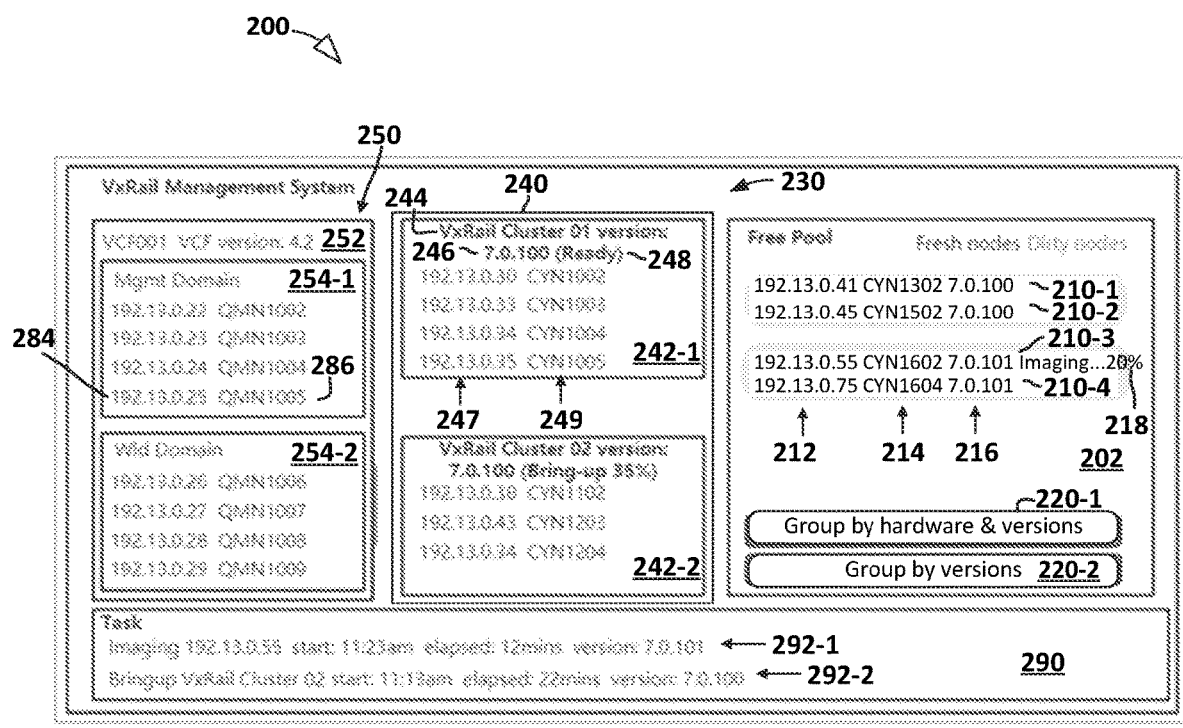
FIG. 2 illustrates an exemplary dashboard user interface displaying node configuration information.

Referring now to FIG. 2, an exemplary dashboard user interface 200 generated by node configuration utility 130 is illustrated. The dashboard user interface 200 depicted in FIG. 2 includes a free pool window 202 identifying free nodes 210, i.e., nodes not assigned to a cluster. The identification of each free node 210 includes, in the depicted example, an IP address 212, a node name 214, and a version number 216. In addition, free nodes 210 may be coded via font color or another visible attribute to distinguish between fresh nodes, i.e., available nodes that require no re-imaging, from dirty nodes, which were previously configured and that require imaging before a subsequent deployment. For each free node 210 that is dirty, the dashboard user interface 200 of FIG. 2 displays imaging progress information 218. The illustrated dashboard user interface further includes grouping options 220 that enable administrators to group free nodes 210 based on version information (grouping option 220-2) or based on a combination of version and hardware configuration (grouping option 220-1). Other embodiments may display more, less, and/or different information for free nodes 210. As an example, dirty and fresh nodes may be indicated by an additional field rather than a font attribute. This variation and similar variations to the depicted dashboard user interface will be understood as being encompassed by the dashboard described herein.

The illustrated dashboard user interface 200 further includes a cluster window 230 identifying one or more multi-node clusters. The cluster window 230 illustrated in FIG. 2 includes a standard cluster window 240 and an advanced cluster window 250. The standard cluster window 240 depicted in FIG. 2 identifies two standard clusters 242-1 and 242-2. Each of the standard clusters 242 is illustrated with identifying information including the cluster name 244, a version identifier 246, and a status identifier 248. In addition, each standard cluster 242 depicted in the standard cluster window 240 of FIG. 2 identifies each node that is part of the cluster. As depicted in FIG. 2, each cluster node is identified by an IP address 247 and a node name 249.

The advanced cluster window 250 illustrated in FIG. 2 identifies one or more tiered or hierarchical cluster objects, each of which includes two or more multi-node component clusters. The advanced cluster window 250 illustrated in FIG. 2 identifies a single VCF 252 comprised of two multi-node domains 254. The domains 254 illustrated in FIG. 2 includes a management domain 254-1 and a workload domain 254-2. Each multi-node domain 254 depicted in FIG. 2 includes information identifying the included nodes by IP address 284 and a corresponding node name 286.

The depicted dashboard user interface 230 still further includes a task window 290 identifying one or more configuration tasks in progress. The task window 290 of FIG. 2 indicates an imaging task 292-1 and a cluster bring-up task 292-2 that are in progress. The imaging task 292-1 reports the re-imaging of the dirty node 210-3 within free pool window 202 while the cluster bring-up task 292-2 identifies the in progress bring-up of the standard cluster 242-2 in the standard cluster window 240. Each configuration task 292 illustrated in FIG. 2 indicates a start time, an elapsed time, and a version number.

Although FIG. 2 illustrates a specific set of information arranged in a particular manner, those of ordinary skill in the field will recognize that the depicted information may be conveyed using an interface arrangement that varies from the depicted example in one or more aspects. As a non-limiting example, the illustrated dashboard user interface 200 is a single page view encompassing free nodes, standard clusters, and advanced clusters whereas alternative embodiments (not depicted) may include two or more pages, each of which depicts a subset of the information illustrated in FIG. 2. For example, the free node window 202, the standard cluster window 240 and the advanced cluster window 250 may each be presented as a separate page or pane.

Figure 3:
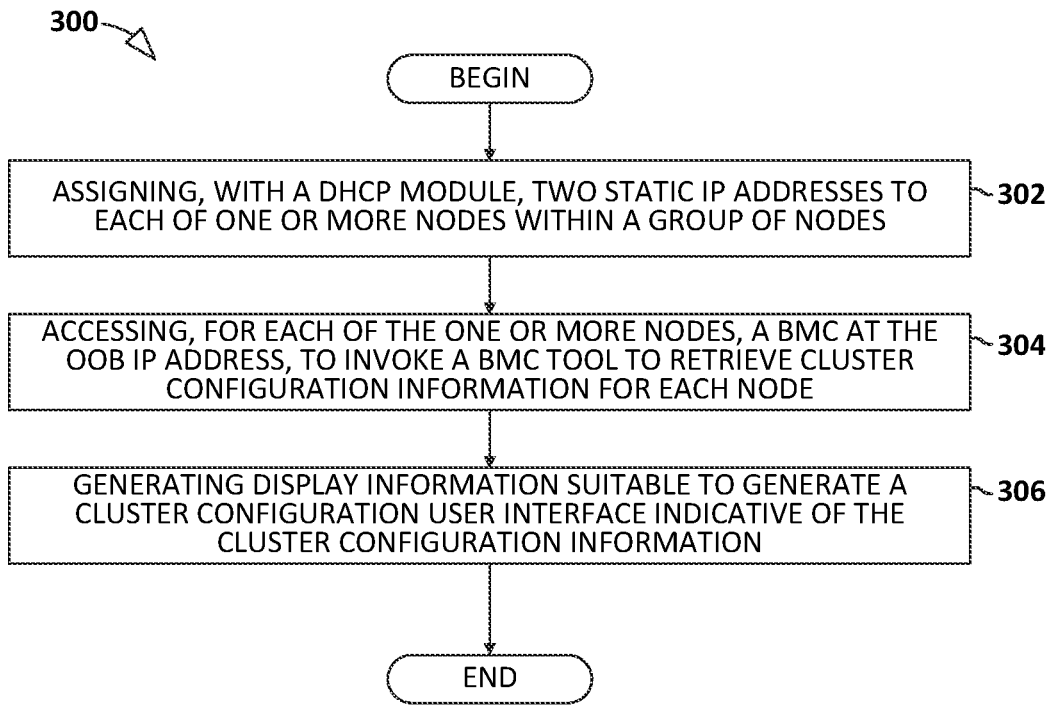
FIG. 3 is a flow diagram illustrating a method of generating a dashboard user interface of FIG. 2.

Turning now to FIG. 3, a method 300 for obtaining and displaying or otherwise conveying configuration information for complex infrastructure is illustrated. The method 300 illustrated in FIG. 3 includes assigning (block 302), with a dynamic host configuration protocol (DHCP) module, two static IP addresses to each of one or more nodes within a group of nodes. The two IP addresses include an out of band (OOB) IP address for a baseboard management controller (BMC) network interface to an OOB management network and an internal management IP address for a network interface associated with an internal management network.

The BMC at each node is then accessed (block 304) at the OOB IP address, to invoke a BMC tool to retrieve cluster configuration information for each node. Display information is then generated (block 306) suitable to generate a configuration dashboard user interface such as the dashboard user interface of FIG. 2.

Figure 4:
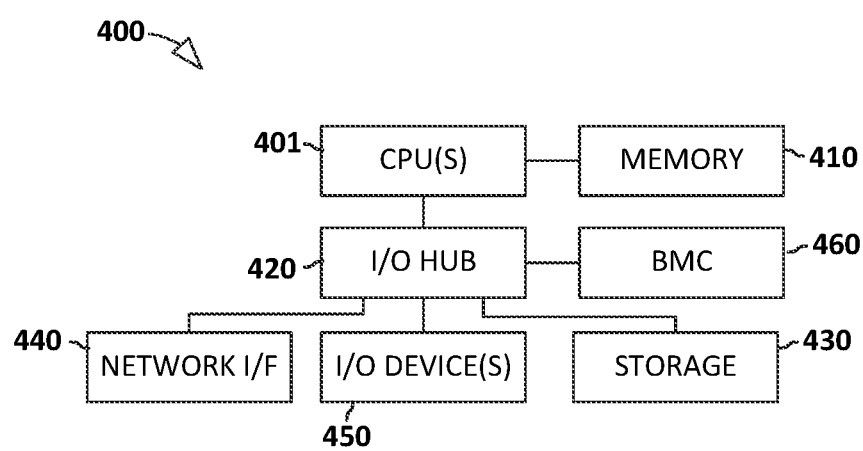
FIG. 4 is a block diagram of an information handling system suitable for use in conjunction with methods and systems disclosed in FIG. 1 through FIG. 3.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
   assigning, with a dynamic host configuration protocol (DHCP) module, two static IP addresses to each of one or more nodes within a group of nodes associated with an information handling system, wherein the two static IP addresses include:
   an out of band (OOB) IP address for a baseboard management controller (BMC) network interface to an OOB management network; and
   an internal management IP address for a network interface associated with an internal management network;

accessing, for each of the one or more nodes, a BMC at the OOB IP address, to invoke a BMC tool to retrieve cluster configuration information for each node; and generating display information suitable to generate a cluster configuration user interface indicative of the cluster configuration information.

2. The method of claim 1, wherein the cluster configuration information includes information indicative of:

whether the node is a cluster node, comprising a node assigned to a cluster, or a free node, comprising a node not assigned to a cluster;

for each free node, whether the free node is a fresh node, comprising a node not previously configured, or a dirty node, comprising a previously configured node; and for each cluster node, a cluster management engine instance associated with the cluster node.

3. The method of claim 2, wherein the cluster configuration information includes a cloud foundation portion indicative of nodes within a VMware cloud foundation including a management domain and one or more workload domains, wherein the cloud foundation portion indicates nodes within the management domain and nodes within each of the one or more workload domains.

4. The method of claim 1, further comprising:

invoking a cluster management engine application programming interface (API) to determine cluster member information indicating other cluster nodes associated with the cluster management engine instance, wherein the cluster configuration information includes the cluster member information.

5. The method of claim 4, wherein the cluster configuration display includes:

a free node portion listing the free nodes; and a cluster portion comprising one or more cluster listings corresponding to one or more clusters, wherein each cluster listing includes a listing of nodes belonging to the cluster.

6. The method of claim 4, wherein the configuration information includes version information indicative of a version of a hyper-converged infrastructure (HCI) appliance.

7. The method of claim 4, further comprising:

responsive to receiving user input, corresponding to user interaction with a portion of the user interface indicating a dirty node, initiating a reimaging request to reimage the dirty node.

8. The method of claim 4, further comprising, obtaining, from an agent executing on a hypervisor associated with the node, hardware information indicative of hardware implemented in the node.

9. The method of claim 8, wherein the cluster configuration user interface displays one or more free node groups, wherein nodes in a free node group are implemented with like hardware.

10. The method of claim 9, further comprising, defining a name of a cluster in accordance with user input to the user interface.

11. The method of claim 4, further comprising, responsive to user input selecting two or more fresh nodes, creating a new cluster encompassing each of the two or more fresh nodes.

12. The method of claim 11, further comprising, responsive to user input indicative of a particular node, configuring the particular node as a primary node for the cluster wherein a cluster manager engine of the particular node is activated and cluster management engines of other nodes in the cluster are deactivated.

13. The method of claim 4, further comprising, responsive to user input dragging and dropping a fresh node into a cluster listing, adding the fresh node to the cluster listing to the fresh node.

14. An information handling system, comprising:

a central processing unit (CPU); and a computer readable memory, accessible to the CPU, including processor executable instructions that, when executed by the CPU, cause the information handling system to perform operations including:

assigning, with a dynamic host configuration protocol (DHCP) module, two static IP addresses to each of one or more nodes within a group of nodes associated with the information handling system, wherein the two static IP addresses include:

an out of band (OOB) IP address for a baseboard management controller (BMC) network interface to an OOB management network; and an internal management IP address for a network interface associated with an internal management network;

accessing, for each of the one or more nodes, a BMC at the OOB IP address, to invoke a BMC tool to retrieve cluster configuration information for each node; and generating display information suitable to generate a cluster configuration user interface indicative of the cluster configuration information.

15. The information handling system of claim 14, wherein the cluster configuration information includes information indicative of:

whether the node is a cluster node, comprising a node assigned to a cluster, or a free node, comprising a node not assigned to a cluster;

for each free node, whether the free node is a fresh node, comprising a node not previously configured, or a dirty node, comprising a previously configured node; and for each cluster node, a cluster management engine instance associated with the cluster node.

16. The information handling system of claim 15, wherein the cluster configuration information includes a cloud foundation portion indicative of nodes within a VMware cloud foundation including a management domain and one or more workload domains, wherein the cloud foundation portion indicates nodes within the management domain and nodes within each of the one or more workload domains.

17. The information handling system of claim 14, further comprising:

invoking a cluster management engine application programming interface (API) to determine cluster member information indicating other cluster nodes associated with the cluster management engine instance, wherein the cluster configuration information includes the cluster member information.

18. The information handling system of claim 17, wherein the cluster configuration display includes:

a free node portion listing the free nodes; and a cluster portion comprising one or more cluster listings corresponding to one or more clusters, wherein each cluster listing includes a listing of nodes belonging to the cluster.

19. The information handling system of claim 17, wherein the configuration information includes version information indicative of a version of a hyper-converged infrastructure (HCI) appliance.

20. The information handling system of claim 17, further comprising:
    responsive to receiving user input, corresponding to user interaction with a portion of the user interface indicating a dirty node, initiating a reimaging request to reimage the dirty node.

\* \* \* \* \*